May 20, 1930.   W. B. COOK   1,759,733

MOTOR VEHICLE HOLDDOWN

Filed May 28, 1929

WITNESSES

INVENTOR
W.B. Cook
BY
ATTORNEY

Patented May 20, 1930

1,759,733

UNITED STATES PATENT OFFICE

WILLIAM B. COOK, OF MEXICO, MISSOURI

MOTOR-VEHICLE HOLDDOWN

Application filed May 28, 1929. Serial No. 366,621.

My invention relates to holddowns for motor vehicles commonly employed to hold automobiles or other vehicles against rolling while in transit.

An object of the present invention is to provide a device of this character which is constructed from lengths of rod bent to provide an axle engaging member, and fastening devices at the ends thereof for penetrating the floor or wall of a freight car to anchor the holddown in place.

Another object of the invention is to provide a device of this character wherein the anchoring devices are attached to the axle embracing member without the use of fastenings.

Figure 1:
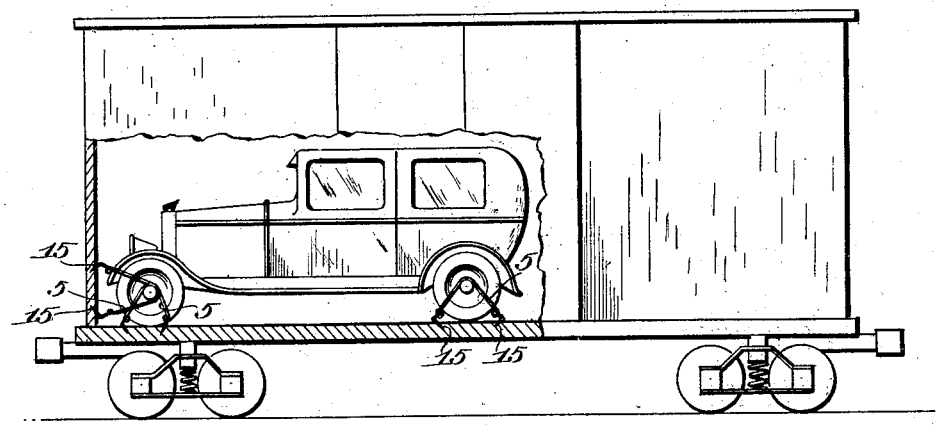
Figure 2:
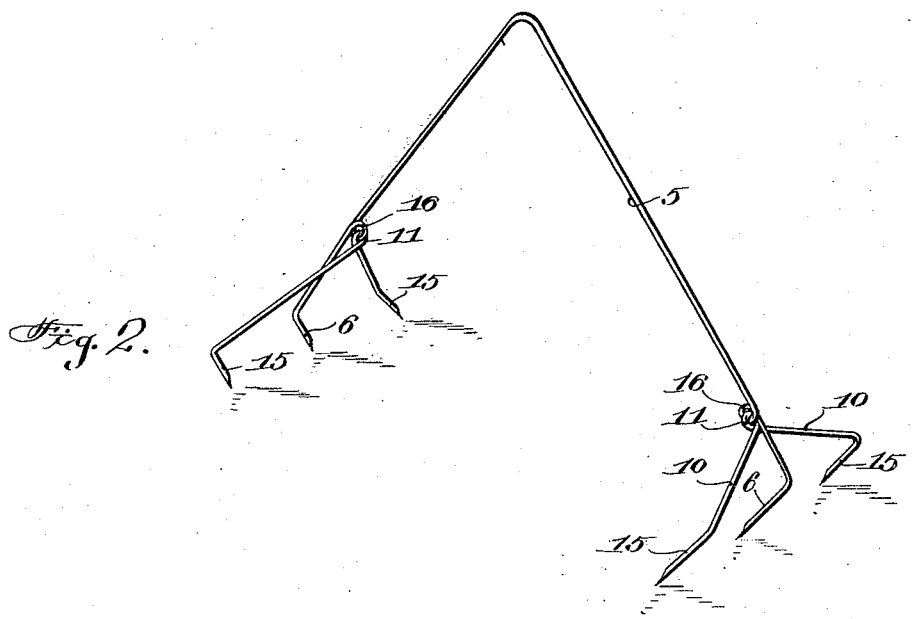

With the preceding and other objects and advantages in mind, the invention consists in the novel combination of elements, constructions and arrangements of parts and operations to be hereinafter more fully described, claimed and illustrated in the accompanying drawings, wherein:

Figure 1 is a view of a freight car partly broken away and illustrating the device engaged with the front and rear axles of a motor vehicle, one of the devices being shown as engaged with one of the end walls of the freight car; and Fig. 2 is a perspective of the invention.

Referring to the invention in detail a substantially V-shaped axle embracing member 5 formed from a single length of rod of requisite ruggedness is provided. The free ends of the axle embracing member are bent at right angles to provide divergent barbs 6. An anchoring device is provided for each free end of the axle embracing member which consists of a length of rod bent to provide divergent arms 10 connected by a loop or eye 11. The free ends of the arms 10 are bent at right angles to provide barbs 15.

To pivotally connect the fastening devices to the axle embracing member the legs of the latter are looped upon themselves adjacent their free ends to provide eyes 16 which pass through the eyes 11 of each of the fastening devices.

In use the axle embracing member is engaged with the axle of the automobile or other vehicle and the barbs 15 and 16 driven into the floor or end wall of the freight car as disclosed in Fig. 1. It will be observed that the barbs 6 will lie parallel with the barbs 15 of each of the fastening devices. Thus a three point anchorage is had at each side of the vehicle axle. Moreover by having the anchoring devices pivoted to the axle embracing member they may be readily swung to a position where the barbs may be driven into place. Furthermore the device is wholly constructed from three lengths of rod which are connected together without the use of fastening elements other than the inter-engagement of the eyes 16 and 11.

What is claimed is:

1. A holddown device for vehicles comprising a substantially V-shaped axle engaging member each leg of which being provided with an eye, and a length of rod engaged with each eye and having its end fashioned with anchoring barbs.

2. In a holddown device, an inverted substantially V-shaped axle embracing member, each leg of which being provided with an eye adjacent its lower end, and a length of rod looped in each eye and terminating in anchoring barbs.

3. In a holddown device, an axle embracing member consisting of a length of rod bent to provide two divergent legs, each of which terminating in an eye, a length of rod looped in each eye and having its end bent at right angles to provide anchoring barbs.

4. In a device of the character described, a length of rod bent into substantial V-shape and each leg of which being bent at right angles towards each other to provide anchoring barbs, a substantially V-shaped member attached to each leg adjacent each barb and having its extremities bent at right angles to provide anchoring barbs which cooperate with the first mentioned barb in anchoring the V-shaped member to a base.

5. In a holddown device for vehicles, an axle embracing member having a loop at each end, and a length of rod looped into each eye and having its ends formed with barbs adapted to be driven into a base to anchor the axle embracing member against movement.

WILLIAM B. COOK.